United States Patent [19]

Wu

[11] Patent Number: 5,326,381
[45] Date of Patent: Jul. 5, 1994

[54] USE OF POLYTETRAFLUOROETHYLENE RESIN PARTICLES TO REDUCE THE ABRASION OF ABRASIVE PIGMENTS

[75] Inventor: Joseph H. Z. Wu, Somerset, N.J.

[73] Assignee: Engelhard Corporation, Iselin, N.J.

[21] Appl. No.: 60,079

[22] Filed: May 10, 1993

[51] Int. Cl.$^5$ .............................................. C09K 3/14
[52] U.S. Cl. ................................. 51/293; 51/308; 106/416; 106/447; 106/486; 106/487; 162/184
[58] Field of Search .................... 51/293, 298, 308; 106/416, 486, 447, 487; 162/184

[56] References Cited

U.S. PATENT DOCUMENTS

| | | | |
|---|---|---|---|
| 3,014,836 | 12/1961 | Proctor | 162/181 |
| 3,058,671 | 10/1962 | Billue | 241/24 |
| 3,171,718 | 5/1965 | Gunn et al. | 23/110 |
| 3,343,973 | 9/1967 | Billue | 106/288 |
| 3,582,378 | 6/1971 | Miller | 106/288 Q |
| 3,586,523 | 6/1971 | Fanselow et al. | 106/288 B |
| 3,838,064 | 9/1974 | Vogt et al. | 252/384 |
| 3,838,092 | 9/1974 | Vogt | 260/33.6 F |
| 3,846,147 | 11/1974 | Tapper | 106/288 B |
| 3,974,089 | 8/1976 | Owen et al. | 252/384 |
| 3,993,584 | 11/1976 | Owen et al. | 252/383 |
| 4,017,324 | 4/1977 | Eggers | 106/288 B |
| 4,381,948 | 5/1983 | McConnell et al. | 106/288 B |
| 4,487,878 | 12/1984 | Vasta | 524/413 |
| 4,678,517 | 7/1987 | Dunaway | 106/309 |
| 4,775,586 | 10/1988 | Bohrn et al. | 162/181.6 |
| 4,799,964 | 1/1989 | Harvey et al. | 106/487 |
| 4,830,673 | 5/1989 | Jones et al. | 106/487 |
| 4,851,048 | 7/1989 | Jones et al. | 106/464 |
| 4,927,465 | 5/1990 | Hyder et al. | 162/181.5 |
| 5,006,574 | 4/1991 | Sennett et al. | 523/351 |
| 5,010,130 | 4/1991 | Chapman et al. | 524/445 |
| 5,022,924 | 6/1991 | Raythatha et al. | 106/486 |
| 5,028,268 | 7/1991 | Ince et al. | 106/416 |
| 5,034,062 | 7/1991 | Lein et al. | 106/416 |
| 5,112,782 | 5/1992 | Brown et al. | 501/144 |

FOREIGN PATENT DOCUMENTS

| | | |
|---|---|---|
| 433872 | 6/1991 | European Pat. Off. |
| 159777 | 4/1983 | German Democratic Rep. |
| 135301 | 6/1986 | Poland. |
| 87521 | 9/1985 | Romania. |

*Primary Examiner*—Mark L. Bell
*Assistant Examiner*—Willie J. Thompson
*Attorney, Agent, or Firm*—Inez L. Moselle

[57] ABSTRACT

A trace amount of a polytetrafluoroethylene resin is incorporated with an abrasive pigment prior to or during the preparation of an aqueous pigment slurry or is applied to dry pigment to reduce the abrasivity of the pigment. The treated pigment can be employed in the manufacture of filled and coated paper.

17 Claims, No Drawings

USE OF POLYTETRAFLUOROETHYLENE RESIN PARTICLES TO REDUCE THE ABRASION OF ABRASIVE PIGMENTS

RELATED APPLICATIONS

This invention is related to U.S. Ser. No. 07/898,116, filed Jun. 12, 1992 and allowed U.S. Ser. No. 07/971,006 (continuation-in-part of U.S. Ser. No. 07/818,116), filed Nov. 3, 1992.

BACKGROUND OF THE INVENTION

This invention relates to a simple means for reducing the abrasivity of abrasive pigments such as calcined clay and titanium oxide pigments used by the paper industry.

Calcined kaolin and titania pigments have been used for several decades in a number of industrial applications such as paper coating, paper filling, paints, plastics, etc. In those applications they impart to the finished products a number of desirable properties: brightness, opacity and hiding power. In the case of calcined kaolin pigments, paper coating and filling applications require almost exclusively ultrafine fully calcined kaolin pigments such as Ansilex 93 ® pigment manufactured by Engelhard Corporation. See, for example, U.S. Pat. No. 3,586,523, Fanselow, et al., the teachings of which are incorporated herein by cross-reference.

These fully calcined pigments have an undesirable property, namely, they are relatively abrasive when compared to noncalcined (hydrous kaolin pigments) or, in some cases, partially calcined (metakaolin) pigments. For example, conventional so-called "low abrasion" calcined kaolin pigments typically have an Einlehner abrasion value of about 20 mg. An ultrafine calcined kaolin pigment which has recently been introduced to the paper industry has a lower abrasion but appears to have lower scatter properties than that of the somewhat coarser but more abrasive products such as ANSILEX 93 pigment. In practical terms, increased abrasivity translates into increased wear of web forming screens (wires) on paper making machines, dulling of paper slitter knives, wear of printing plates when they come into contact with coated paper containing fine calcined pigments in the coating formulation, and, in general, wear of any surfaces coming into contact with these pigments. Titanium dioxide pigments are generally significantly more abrasive than fully calcined kaolin pigments.

The Einlehner abrasion test simulates the wear of the web forming screens, other paper-making machine wear and printing plate wear; while another test, the filled-sheet needle abrasion test simulates wear on slitter and knife wear in the paper finishing and converting operations.

Paper makers are becoming increasingly demanding in their need for lower abrasion. To overcome the problem, suitable kaolin can be calcined at temperatures less than those required to produce fully calcined pigments. In this instance, calcination temperature is controlled to produce the form of pigment known as metakaolin. It is known, however, that the brightness of a metakaolin pigment is always poorer, generally by about 2-3%, than that of fully calcined pigments derived from the same clay calciner feed. However, even metakaolin pigments may be more abrasive than paper makers may desire. Examples of patents disclosing calcination of kaolins to provide pigments include: U.S. Pat. No. 3,586,523, Fanselow, et al.; U.S. Pat. No. 3,014,836, Proctor; U.S. Pat. No. 3,058,671, Billue; U.S. Pat. No. 3,343,943, Billue; U.S. Pat. No. 3,171,718, Gunn, et al.; U.S. Pat. No. 4,381,948, McConnell, et al. and U.S. Pat. No. 5,112,782, Brown, et al. Many of these patents make reference to the desirability of reduced abrasivity but in all cases achieve such result by kaolin crude selection and/or processing conditions utilized in steps carried out prior to the final calcination of the original hydrous kaolin feed.

U.S. Pat. No. 4,678,517, Dunaway; U.S. Pat. No. 4,830,673, Jones, et al.; and U.S. Pat. No. 5,022,924, Raythatha, et al. disclose the addition of: particulate oxidizable materials, particularly sawdust; aliphatic diols; and colloidal or fumed silica, respectively, to clays prior to calcination in order to obtain performance benefits, including reduced abrasivity, in the calcined clay.

Originally kaolin pigments were supplied in dry form to the end users. The demand for pigments in aqueous slurry form developed with the availability of appropriate shipping and handling facilities. Since the cost of shipping water is an undesirable expense, it is desirable to provide pigment slurries as concentrated as is feasible, consistent with the necessity of formulating slurries that are sufficiently fluid to be pumped yet are resistant to settling. This posed no significant problem when formulating slurries of hydrous (uncalcined kaolins); using conventional anionic clay dispersants such as condensed phosphate salts and conventional clay handling equipment, 70% solids slurries of fine particle size coating grade hydrous kaolin were readily achieved.

Slurries of fine particle size calcined kaolin pigments containing about 50% solids have been commercially available for several years and require the use of organic polymers to prevent sedimentation. The "normal" procedure of making such slurries of calcined kaolin slurries is first to make an aqueous solution of a thickening agent, such as CMC (carboxymethyl cellulose), in water containing a microbicide, then add a dispersant, such as C211 (sodium polyacrylate) and mix the slurries in a high shear mixer.

Patents related to the stabilization and rheology enhancement of aqueous slurries of calcined kaolin include U.S. Pat. No. 5,034,062, Lein, et al., U.S. Pat. No. 5,028,268, Ince, et al., U.S. Pat. No. 4,017,324, Eggers, and U.S. Pat. No. 3,846,147, Tapper.

Other patents relating to the production of slurries of calcined kaolin clay or calcined pigments derived from kaolin clay are U.S. Pat. No. 3,582,378, Miller and U.S. Pat. No. 5,006,574, Sennett, et al., both assigned to the assignee of the subject patent application.

Applicant's copending applications, U.S. Ser. No. 07/898,116 and U.S. Ser. No. 07/971,006 (both also assigned to the assignee of the instant application) relate to the use of various surfactants to reduce abrasion.

The present application relates to the use of polytetrafluoroethylene (PTFE) resin particles to reduce Einlehner abrasion.

The use of PTFE resins to control dusting of fine powders is disclosed in U.S. Pat. Nos. 3,838,064, 3,838,092, 3,974,089 and 3,993,584. After the PTFE resin is added, it is subjected to treatment intended to fibrillate the resin, resulting in a random network of PTFE fibers distributed throughout the fine powder.

SUMMARY OF THE INVENTION

The present invention provides a simple inexpensive means to decrease the abrasivity of abrasive pigments such as calcined kaolin and titania. In accordance with this invention, a trace amount of a colloidal dispersion of polytetrafluoroethylene (PTFE) resin particles, is incorporated with the abrasive pigment prior to or during the preparation of an aqueous pigment slurry, or the colloidal dispersion of the PTFE resin can be added onto dry abrasive pigments.

The PTFE resin particles are admixed with the abrasive pigment, in slurry or dry form, at ambient room temperatures and under application and mixing conditions so as to promote a substantially uniform mixture, but without fibrillation of the resin particles.

Abrasion values referred to herein are determined by the Einlehner test operated under conditions described in copending U.S. Ser. No. 07/971,006, the teachings of which are incorporated herein by cross-reference.

The PTFE resins useful in the practice of this invention are not detrimental to slurry stability or to end-use performance of paper products.

PREFERRED EMBODIMENTS

Particularly advantageous and effective results were obtained in the practice of this invention by the use of colloidal dispersions of two Teflon ® Fluorocarbon Resins from DuPont; TEFLON dispersions TE-3170 and TE-30. These two PTFE-fluorocarbon resin dispersions are hydrophobic, negatively charged colloids, comprising approximately 60% by weight of PTFE resin, and about 6% (by weight of resin solids) of a non-ionic wetting agent, octyl or nonyl phenoxypolyethoxyethanol, plus a stabilizer with the balance water. TE-30 contains substantially spheroidal PTFE resin particles that range from about 0.05 to 0.5 microns diameter, with an average particle size of about 0.22 microns, whereas TE-3170 contains substantially spheroidal resin particles in a narrow particle size distribution of between 0.1 and 0.2 microns, with an average particle size of less than 0.185 microns.

The amount of PTFE resin particles required to obtain the benefits of the invention may vary with the particular pigments and their surface characteristics, and be affected by other ingredients in the slurry. Addition levels of 0.01%–0.50% PTFE resin (dry resin to dry clay basis) were found to be effective in reducing abrasion of calcined kaolin pigments.

Pigments which may benefit by addition of PTFE resins include fully calcined kaolin, preferably fine particle size fully calcined kaolin having an average size of about 0.6 to 0.8 microns, metakaolin pigments and titanium dioxide. These may be used alone or in admixture with each other or with nonabrasive pigments such as hydrous kaolin clay. Other abrasive pigments which may be improved include, by way of example, ground carbonate minerals such as calcite or other forms of calcium carbonate. Very effective results have been achieved by treating Ansilex 93 ® fully calcined kaolin pigment supplied by Engelhard Corporation. ANSILEX 93 pigment has the following approximate particle size distribution (determined by sedimentation using a SEDIGRAPH ® 5000 particle size analyzer):
88 to 90 weight percent finer than two microns,
70 weight percent finer than one micron,
10 weight percent finer than 0.5 micron.
Median particle size, about 0.75 micron.

The colloidal aqueous dispersion of PTFE resin particles can be mixed with the abrasive pigment at ambient temperature during slurry makedown, producing slurries containing, for example, from 10% to about 60% solids. In addition to pigment, water and the PTFE resin dispersions, materials conventionally used in pigment slurry preparation may be present. Examples of such materials are biocides, colloidal thickening agents, CMC and dispersants. For example, up to about 0.2% by weight of an acrylate pigment dispersant may also be present.

Alternatively, a colloidal dispersion of the PTFE resin can be applied to dry pigments. Very effective results were achieved when colloidal dispersions of PTFE were diluted with sufficient water to result in systems containing 1-2% polytetrafluorocarbon resin, with the diluted dispersions then sprayed directly onto dried calcined kaolin pigment, followed by drying and pulverization.

While liquid forms of fluoropolymer dispersions were used in the following examples, dry powder forms of fluoroadditives should function as well. As dry PTFE powders comprise loose agglomerates of sub-micron sized resin particles; the agglomerates would need to be dispersed. The fluoropolymer powders could be added directly to a calcined kaolin slurry which contains an appropriate dispersing agent and then sufficiently stirred to achieve a uniform distribution of the PTFE resin particles in the slurry. In treating a dry form of an abrasive pigment, the desired amount of dry PTFE resin powder and a surfactant (such as octylphenoxy polyethoxy ethanol surfactant) could be admixed in water to make a PTFE dispersion, and then the dispersion could be sprayed onto the pigments.

The following examples are given for illustrative purposes only.

EXAMPLE 1

Example 1 was conducted to test the efficacy of applying a colloidal aqueous dispersion of TEFLON resin to dry abrasive pigment particles.

A treatment of dry calcined kaolin pigment with 0.1% (weight percent dry resin, dry clay basis) TEFLON resin was prepared by the following method. TEFLON polytetrafluoroethylene resin dispersion TE-30 from DuPont Polymers, (60% active) was diluted to 2% PTFE resin content with deionized water by adding 1.7 grams of TE-30 to 48.3 grams of deionized water and then stirred by a magnetic stir bar for 10 minutes. The diluted TEFLON dispersion was then put into a KIMAX chromatography sprayer. At ambient room temperature, five grams of the diluted TEFLON dispersion were sprayed on each 100 grams of dried unpulverized calcined kaolin powder (ANSILEX 93 fully calcined kaolin). The ANSILEX pigment particles were laid on a 12"×20" stainless steel pan and received a single spray application of the resin dispersion, without mixing of the particles. A total of 1000 grams of the treated clay, which had been sprayed by the aforementioned method, was then dried in an oven at 90° C overnight. The dried samples, which contained less than 0.5% moisture, were then pulverized using a 0.039" round hole screen for 1 pass. The samples were then ready to be tested for Einlehner abrasion. The control samples were made through the same process, except that the clay was sprayed with water only.

The same method as above was used to produce a PTFE treated sample at a 0.05% TEFLON dosage level (dry resin based on dry clay), except that the TE-30 aqueous dispersion was first diluted to a 1% resin solids (instead of 2% resin solids) prior to spraying onto the dry calcined pigments.

The results of the Einlehner abrasion tests of the treated, fully-calcined pigment are tabulated in Table 1.

TABLE 1

Einlehner Abrasion (loss mg) of
PTFE-Treated Dry Fully Calcined Kaolin Pigment

| Control (untreated) | PTFE Treated (based on dry clay) | |
|---|---|---|
| | 0.05% | 0.1% |
| 22 23 17 17 19 22 | 15 15 17 | 11 9 11 |

Data in Table 1 showed that PTFE treated dry AN-SILEX 93 samples had much lower Einlehner abrasion than the untreated control samples.

The PTFE treated and untreated ANSILEX 93 pigment samples were submitted to a foaming test. The foaming tendencies of the samples were visually observed when the pigments were made-down using conventional laboratory procedure. When high shear was applied to the slurry with a WARING BLENDOR ® mixer, both untreated and 0.5% PTFE-treated demonstrated almost no foaming. The 0.10% PTFE-treated sample generated only slightly more foam.

EXAMPLE 2

Example 2 was conducted to test the efficacy of applying PTFE treatment to abrasive pigment particles in an aqueous slurry.

Polytetrafluoroethylene resin dispersions, TE-3170 and TE-30 were added to batches of a 51.8% weight percent slurry of fully calcined clay at four different addition levels. The calcined kaolin pigment was a plant run batch of ANSILEX 93 fully calcined pigment in slurry form.

In each test, three hundred and eight grams of the slurry, containing 200 dry grams ANSILEX 93 pigment, was withdrawn from a storage container, put into a beaker, and stirred with an air mixer. While the low shear mixing was applied, an amount of the TEFLON aqueous dispersion, containing 60% resin solids, was added into the slurry. After three minutes of low shear mixing, the treatment was completed. Each sample was then submitted for Einlehner abrasion testing. All procedures were conducted at ambient room temperatures.

In one test 0.033 grams of TE-30 (containing 0.02 grams of TEFLON resin) was added into the slurry. This amount corresponds to a 0.01 weight percent dosage of TEFLON resin based on dry clay content. Similarly, amounts of TE-30 equivalent to TEFLON resin dosages of 0.05% and 0.10% were added to fresh slurry samples and the procedures followed as above.

The same procedures were applied to another suite of slurry samples, except that TEFLON dispersion TE-3170 was used, instead of TE-30. Additional levels corresponded to TEFLON resin dosages of 0.01%, 0.05% and 0.10% and 0.50% weight percent resin, dry clay basis.

The Einlehner abrasion of the PTFE treated calcined kaolin slurry samples and a suite of untreated control samples was measured, using the Einlehner test procedures described in U.S. Ser. No. 07/818,116.

TABLE 2

Einlehner Abrasion (loss mg) of PTFE Treated
and Untreated Plant Calcined Kaolin Slurries

| Control (untreated) | | PTFE treated (based on dry clay) | | | |
|---|---|---|---|---|---|
| | | 0.01% | 0.05% | 0.10% | 0.50% |
| 20, 20, 20, 21, 20, 21 | TE-30 | 17 | 9 | 7 | — |
| | TE-3170 | 17 | 10 | 8, 8 | 7 |

EXAMPLE 3

This example was conducted to determine what effects TEFLON treatment has on the performance of the pigments in paper coating applications.

Batches of ANSILEX 93 pigment in slurry form treated with TE-30 and TE-3170 (0.05% resin dosage) and untreated were incorporated into paper coating formulations typical of formulations used in the United States for light weight coated (LWC), offset printing applications. This coating color formulation contained:

| ANSILEX 93 pigment | 10% |
|---|---|
| Standard #1 hydrous kaolin | 22.5% |
| Delaminated hydrous kaolin | 67.5% |
| Dow Latex 640 | 8% |
| PG 280 | 8% |
| Nopcote ® C-104 | 0.5% |
| Sunrez ® 700 C | 0.8% |

The viscosity of the coating formulations made with treated and untreated calcined clay were subjected to viscosity testing, using conventional testing methods with results presented in Table 3:

TABLE 3

Viscosity of PTFE Treated and Untreated Calcined
Kaolin Containing Coating Formulations

| | A 93 Control | TE-30 | TE-3170 |
|---|---|---|---|
| Solids | 56.9 | 57.0 | 57.0 |
| Brookfield (up) | | | |
| 20 rpm | 2900 | 3025 | 2970 |
| 100 rpm | 1050 | 988 | 1172 |
| Hercules End Point 4400 rpm "E" bob | 28.8 | 26.4 | 27.6 |

These data indicate that PTFE treatment has no significant impact on the low shear (Brookfield) or high shear (Hercules) viscosities of the coating color formulations tested.

The LWC base stock was coated with the formulations at the level of 5.5 pounds per 3300 sq. ft. The coated paper was then calendared at 2 nips, 3200 psig, 140° F. The coated paper properties were then measured using conventional procedures:

TABLE 3A

LWC Offset Sheet Properties with
PTFE Treated and Untreated Calcined Pigments

| | A93 control | TE-30 | TE-3170 |
|---|---|---|---|
| Gloss (%) | 52 | 51 | 51 |
| Brightness (%) | 68.6 | 68.6 | 68.6 |
| Opacity (%) | 84.8 | 84.9 | 84.6 |
| Print gloss % @ o.d. = 1.4 | 72 | 70 | 69 |
| K&N (% change) | 22 | 22 | 22 |
| IGT pick (vvp) | 17 | 17 | 17 |

The results indicate that of the properties measured, the PTFE treated pigment performed substantially the same as the untreated pigment, with the possible exception of a slight degradation in print gloss.

EXAMPLE 4

This example was conducted to test the impact of the PTFE treated calcined pigment on filled sheet opticals and needle abrasion.

Batches of ANSILEX 93 slurry at 50% solids, untreated and treated with 0.4% resin dosage of TE-30, were submitted for a paper filling study. Using conventional paper laboratory techniques, the slurries were diluted and used to fill uncoated groundwood-free base sheet at the loading levels indicated below. The finished sheets were then subjected to a needle abrasion test, using procedures widely practiced in the industry, wherein a bronze needle inserted in a sewing machine is used to pierce 10,000 times an eight sheet thick stack of filled sheets (basis weight 74 g/m$^2$), while the stack is slowly moved. The weight loss of the needle is then measured. The accuracy of this test is such that a difference of 100 micrograms or more is significant.

The sheets were also tested for conventional paper opticals.

TABLE 4

Paper Opticals and Needle Abrasion of Paper Filled with PTFE treated and Untreated Calcined Pigments

| Pigment Filler | Mineral Content | Brightness GEB | Tappi Opacity | Needle Abrasion Micrograms Loss |
|---|---|---|---|---|
| Unfilled | 0% | 85.6 | 75.7 | 48 |
| ANSILEX 93 - untreated | 4% | 86.8 | 80.4 | 580 |
|  | 10% | 88.3 | 84.5 | 750 |
|  | 14% | 88.8 | 86.8 | 800 |
| ANSILEX 93 - treated 0.4% PTFE resin | 4% | 87.0 | 86.4 | 355 |
|  | 10% | 88.3 | 85.2 | 670 |
|  | 14% | 88.5 | 87.0 | 840 |

The data indicate that PTFE treatment at a dosage of 0.4% (PTFE resin to dry pigment) has no significant effect on filled sheet opticals (brightness and opacity); PTFE treatment possibly may have a marginal benefit on needle abrasion at lower filling levels, but there is no significant difference at higher pigment filling levels between PTFE treated and untreated calcined pigments.

I claim:

1. An improved pigment composition consisting essentially of particles of an abrasive pigment mixed with substantially spherical nonfibrillated colloidal particles of polytetrafluoroethylene resin, said particles of resin being present in an amount effective to reduce the Einlehner abrasion of said abrasive pigment.

2. The pigment of claim 1 wherein said abrasive pigment is calcined kaolin.

3. The pigment of claim 1 wherein said resin is present in amount of from 0.01% to 0.5% weight percent, based on the dry weight of said pigment.

4. The pigment of claim 1 which is in the form of an aqueous slurry.

5. The pigment of claim 1 wherein said pigment is a fine particle size calcined kaolin clay and is mixed with from 0.01% to 0.5% by weight of said polytetrafluoroethylene resin, based on the dry weight of said pigment.

6. The pigment of claim 5 which is a fully calcined kaolin clay.

7. The pigment of claim 5 or 6 which is in the form of an aqueous slurry.

8. The pigment of claim 5 or 6 which is in the form of an aqueous slurry having a clay solids content about 50% by weight.

9. A slurry comprising water and solids consisting essentially of particles of fully calcined clay pigment having an average size in the range of 0.6 to 0.8 microns and from 0.01% to 0.2% based on the dry weight of said pigment, of substantially spherical colloidial nonfibrillated particles of a polytetrafluoroethylene resin, said amount of said polytetrafluoroethylene resin being effective to reduce the Einlehner abrasion of said pigment.

10. The slurry of claim 9 which contains 0.05% to 0.15% of said polytetrafluoroethylene resin based on the dry weight of said pigment.

11. A process for decreasing the Einlehner abrasion of an abrasive pigment which is in the form of an aqueous slurry, said process comprising mixing said slurry at low shear and at ambient temperature with a colloidal aqueous dispersion of polytetrafluoroethylene resin particles without fibrillating said resin particles, the amount of said resin dispersion being effective to reduce the abrasion of said pigment.

12. A process for decreasing the Einlehner abrasion of a dry abrasive pigment which comprising applying at ambient room temperature a colloidal aqueous dispersion of polytetrafluoroethylene substantially spherical resin particles to a dry abrasive pigment at ambient temperature without fibrillating said resin particles, the amount of said resin dispersion being effective to reduce the abrasion of said pigment.

13. The process of claim 11 or 12 wherein said pigment is a calcined kaolin.

14. The process of claim 11 or 12 wherein said particles of resin have an average size in the range of 0.10 to 0.30 microns.

15. The process of claim 12 wherein said dispersion is applied to said abrasive pigment by spraying.

16. A process for decreasing the Einlehner abrasion of a fully calcined kaolin pigment having an average size in the range of 0.6 to 0.8 microns, which comprises mixing under low shear conditions and at ambient temperature from 0.01% to 0.5% weight percent based upon the dry weight of said pigment, of polytetrafluoroethylene resin particles contained in an aqueous dispersion, said resin particles being substantially spheroidal and having an average size in the range of 0.10 to 0.30 microns, and recovering the admixture without fibrillating said resin particles.

17. A paper web comprising the pigment of claim 5 or claim 6.

* * * * *